US012806892B2

(12) United States Patent
Ziegler et al.

(10) Patent No.: US 12,806,892 B2
(45) Date of Patent: Nov. 24, 2026

(54) METHOD TO PRODUCE A PANEL UNIT AND A PANEL

(71) Applicant: Välinge Innovation AB, Viken (SE)

(72) Inventors: Göran Ziegler, Viken (SE); Rickard Rittinge, Förslöv (SE)

(73) Assignee: VÄLINGE INNOVATION AB, Viken (SE)

( * ) Notice: Subject to any disclaimer, the term of this patent is extended or adjusted under 35 U.S.C. 154(b) by 98 days.

(21) Appl. No.: 17/856,108

(22) Filed: Jul. 1, 2022

(65) Prior Publication Data

US 2023/0013455 A1 Jan. 19, 2023

(30) Foreign Application Priority Data

Jul. 7, 2021 (SE) .................................... 2150903-9

(51) Int. Cl.
*B32B 37/18* (2006.01)
*B32B 7/03* (2019.01)
(Continued)

(52) U.S. Cl.
CPC ................ *B32B 37/18* (2013.01); *B32B 7/03* (2019.01); *B32B 7/12* (2013.01); *B32B 21/02* (2013.01);
(Continued)

(58) Field of Classification Search
CPC ........... B27D 1/00; B32B 37/18; B32B 37/06; B32B 37/10; B32B 37/1284; B32B 21/02;
(Continued)

(56) References Cited

U.S. PATENT DOCUMENTS 4,140,837 A * 2/1979 Drees ..................... D21H 27/26 428/409
6,887,583 B1 * 5/2005 Rakauskas ............ B44C 5/0492 428/536
(Continued)

FOREIGN PATENT DOCUMENTS

AU 2019284025 A1 10/2020
CN 108698380 A 10/2018
(Continued)

OTHER PUBLICATIONS

U.S. Appl. No. 17/768,047, filed Apr. 11, 2022, Rickard Rittinge.
(Continued)

*Primary Examiner* — John L Goff, II
(74) *Attorney, Agent, or Firm* — Boone IP Law

(57) ABSTRACT

A method to produce a panel unit, including providing a core having a first surface and a second surface opposite the first surface, applying a surface layer to the first surface of the core, the surface layer including a wood veneer layer and a first binder layer for adhering the wood veneer layer to the first surface of the core, applying a balancing layer to a second surface of the core, the balancing layer including an unimpregnated paper and a second binder layer for adhering the unimpregnated paper to the second surface of the core, applying pressure to the surface layer, the balancing layer, and the core to form a panel unit. The disclosure also relates to a panel.

20 Claims, 2 Drawing Sheets

(51) Int. Cl.

| | |
|---|---|
| ***B32B 7/12*** | (2006.01) |
| ***B32B 21/02*** | (2006.01) |
| ***B32B 21/04*** | (2006.01) |
| ***B32B 21/06*** | (2006.01) |
| ***B32B 21/14*** | (2006.01) |
| ***B32B 29/00*** | (2006.01) |
| ***B32B 37/06*** | (2006.01) |
| ***B32B 37/10*** | (2006.01) |
| ***B32B 37/12*** | (2006.01) |

(52) U.S. Cl.

CPC ............ *B32B 21/042* (2013.01); *B32B 21/06* (2013.01); *B32B 21/14* (2013.01); *B32B 29/005* (2013.01); *B32B 37/06* (2013.01); *B32B 37/10* (2013.01); *B32B 37/1284* (2013.01); *B32B 2255/08* (2013.01); *B32B 2255/26* (2013.01); *B32B 2260/028* (2013.01); *B32B 2260/046* (2013.01); *B32B 2305/07* (2013.01); *B32B 2307/732* (2013.01); *B32B 2309/02* (2013.01); *B32B 2309/12* (2013.01); *B32B 2317/125* (2013.01); *B32B 2317/16* (2013.01); *B32B 2419/04* (2013.01); *B32B 2607/00* (2013.01)

(58) Field of Classification Search

CPC ....... B32B 21/042; B32B 21/06; B32B 21/14; B32B 2260/028; B32B 2305/07; B32B 2309/02; B32B 2309/12; B32B 2317/125; B32B 2317/16; B32B 2419/04; B32B 2607/00; B32B 7/03; B32B 7/12; B32B 29/005; B32B 29/02; B32B 2255/08; B32B 2255/26; B32B 2260/046; B32B 2307/732; B32B 2479/00; B32B 37/0007; B32B 37/1027; B32B 37/24; B27N 3/18; B27N 3/02; B27N 3/04; B27N 3/203; B27N 3/24; B27N 7/005; B44C 5/043; E04F 15/107; E04F 15/102

See application file for complete search history.

(56) References Cited

U.S. PATENT DOCUMENTS

| | | | | |
|---|---|---|---|---|
| 2007/0102108 | A1 | 5/2007 | Zheng et al. | |
| 2009/0162680 | A1 | 6/2009 | Zheng et al. | |
| 2013/0196119 | A1* | 8/2013 | Dobecz | B32B 37/003 156/87 |
| 2016/0311194 | A1 | 10/2016 | Brown et al. | |
| 2016/0375674 | A1* | 12/2016 | Schulte | E04F 15/045 156/220 |
| 2018/0272648 | A1* | 9/2018 | Ding | B32B 5/26 |
| 2019/0047263 | A1 | 2/2019 | Braun | |

FOREIGN PATENT DOCUMENTS

| | | | |
|---|---|---|---|
| WO | 2018/126332 | A1 | 7/2018 |
| WO | 2021076041 | A1 | 4/2021 |
| WO | WO-2022200890 | A1 * | 9/2022 |

OTHER PUBLICATIONS

International Preliminary Report on Patentability received for PCT Patent Application No. PCT/SE2022/050669, mailed on Jan. 18, 2024, 13 pages.

International Search Report and Written Opinion received for PCT Patent Application No. PCT/SE2022/050669, mailed on Oct. 5, 2022, 17 pages.

Office Action received for Swedish Patent Application No. 2150903. 9, mailed on Feb. 25, 2022, 11 pages.

Extended European Search Report mailed on Apr. 4, 2025 by the European Patent Office in Application No. EP 22838121.6 (13 pages).

Chinese Office Action for Application No. 202280046775.5 issued by the State Intellectual Property Office of People's Republic of China dated Aug. 1, 2025, 19 pages.

* cited by examiner

METHOD TO PRODUCE A PANEL UNIT AND A PANEL

CROSS REFERENCE TO RELATED APPLICATIONS

The present application claims the benefit of Swedish Application No. 2150903-9, filed on Jul. 7, 2021. The entire contents of Swedish Application No. 2150903-9 are hereby incorporated herein by reference in their entirety.

TECHNICAL FIELD

Embodiments of the present disclosure relate to a method to produce a panel unit, a panel unit, and a panel.

BACKGROUND

Building panels, such as floor panels, often have a lowermost layer known as a balancing layer, which sometimes also may be named a counteracting layer. The balancing layer is adapted to balance the surface layer such that an essentially flat panel is maintained, both after pressing and when being installed.

For a laminate panel, having a surface layer comprising at least one resin impregnated paper, such as a DPL (Direct Pressure Laminate), the balancing layer conventionally is formed of a resin impregnated paper to balance forces formed by the resin impregnated paper of the surface layer.

For a veneered building panel, having a surface layer comprising a wood veneer layer, the balancing layer conventionally comprises a wood veneer layer. However, having wood veneers on both sides adds to the cost of the panel and consumes more wood veneer resources.

When the surface layer comprises a thermosetting resin, such as amino resin, the balancing layer is adapted to counteract or balance forces generated by curing of the thermosetting resin both during pressing, cooling, and when installed during various climate conditions.

Layers on a front surface of a core, adapted for forming a surface layer when installed, and layers arranged on the rear surface of the core, named balancing layer, are exposed to a first shrinking when a thermosetting resin in the surface layer and in balancing layer cures during pressing. The balancing layer balances the tension that is created by the surface layer and the panel is substantially flat with a small convex backward bending when it leaves the press. Such first shrinking and balancing of the panel is below referred to as "pressing balancing". The second temperature shrinking, when the panels is cooled from about 150-200° C. to room temperature, is also balanced by the balancing layer and the panel is essentially flat. The second balancing is below referred to as "cooling balancing". A small convex backward bending is preferred since this counteracts upward bending of the edges in dry conditions when the relative humidity may go down to 20% or lower during wintertime.

A problem is that this essentially flat panel comprises tension forces caused by the shrinking of the surface and balancing layers during pressing and during cooling to room temperature.

The surface layer and the core will swell in summertime when the indoor humidity is high and shrink in wintertime when the indoor humidity is low. The panels will shrink and expand, and a cupping of the edges may take place. The balancing layer is used to counteract such cupping. In the installed panel, the balancing layer is used to work as a diffusion barrier for moisture from the underlying structure, and to minimize the impact of the surrounding climate. Consequently, the balancing layer is adapted to balance shrinking and expansion caused by both pressing, cooling and varying climate conditions.

In laminate flooring, standard SS-EN 13329:2016+A1:2018 defines, among other, that cupping at a long side edge should be ≤0.50% concave and ≤1.00% convex and at a short side edge should be ≤0.15% concave and ≤0.20% convex, as seen from the decorative surface of the flooring. Similar ranges are desirable for a wood veneer floor panel. However, it may be desirable to control cupping to be in a more restricted range, especially for short sides. For short side edges, it can be advantageous that there is substantially no cupping, i.e., close to 0. A number exceeding 0 indicates a convex cupping of the upper surface, and a number below 0 indicates a concave cupping of the upper surface. Cupping of long side edges is often reduced when the floor panels are installed and mechanically locked to an adjacent floor panel, especially for long planks. However, cupping of short side edges usually remains after installation of the floor panels. Short side edges with remaining cupping after installation may influence the visual perception of the installed floor such that the installed floor panels look curved. It is desirable to restrict such curvature of the installed floor panel to be less than 0.2% of the width of the floor panel. Zero indicates no cupping (flat), a number exceeding 0 indicates a convex cupping of the upper surface, and a number below 0 indicates a concave cupping of the upper surface of the floor panel.

SUMMARY

It is an object of at least embodiments of the present disclosure to provide an improvement over the above described techniques and known art.

According to a first aspect, a method to produce a panel unit is provided. The method comprises:

- providing a core having a first surface and a second surface opposite the first surface,
- applying a surface layer to the first surface of the core, the surface layer comprising a wood veneer layer and a first binder layer for adhering the wood veneer layer to the first surface of the core,
- applying a balancing layer to a second surface of the core, the balancing layer comprising an unimpregnated paper and a second binder layer for adhering the unimpregnated paper to the second surface of the core, and
- applying pressure to the surface layer, the balancing layer, and the core to form a panel unit.

The step of applying pressure may comprise applying heat and pressure.

By unimpregnated is understood to mean free from synthetic resin, or substantially free from synthetic resin, such as comprising less than 10 wt % of synthetic resin, preferably less than 5 wt % of synthetic resin, such as less than 2.5 wt % of synthetic resin, prior to being applied on the core. In one example, no synthetic resin has been added to the paper prior to being applied on the core.

After pressing, the panel unit may be divided into individual panels. The panels may be building panels, such as floor panels, wall panels, furniture panels, a countertop panel, etc.

The balancing layer may consist of the unimpregnated paper and the second binder layer.

The unimpregnated paper may form a lowermost surface of the panel unit after pressing.

A fibre direction of the unimpregnated paper may be oriented along a grain direction of the wood veneer layer.

A fibre direction of the unimpregnated paper may be oriented substantially parallel to a grain direction of the wood veneer layer, such as parallel with 25° or less. The unimpregnated paper may comprise alpha-cellulose, such as 80 wt % alpha-cellulose, such as at least 90 wt % alpha-cellulose, such as at least 95 wt % alpha-cellulose. The unimpregnated may be an alpha-cellulose paper.

The unimpregnated paper may be substantially free from natural resins, such as comprising less than 10 wt % natural resins, such as less than 5 wt % natural resins, such as less than 1 wt % natural resins.

The unimpregnated paper may comprise bleached fibres. The unimpregnated paper may be made from bleached pulp. The unimpregnated paper may be from delignified pulp.

The unimpregnated paper may have weight of 15-150 g/m$^2$, such as 15-50 g/m$^2$, such as 20-40 g/m$^2$.

The unimpregnated paper may be or comprise an unimpregnated décor paper. Such a décor paper may be coloured or comprise a print. Such a décor paper may comprise at least 80 wt % alpha-cellulose, such as at least 90 wt % alpha-cellulose, such as at least 95 wt % alpha-cellulose. The décor paper may of be the type intended for forming a decorative layer or décor layer in laminate flooring.

The unimpregnated paper may be or comprise an unimpregnated overlay paper. Such an overlay paper may be free from any print and/or décor. Such an overlay paper may comprise at least 90 wt % alpha-cellulose, such as at least 95 wt % alpha-cellulose, such as at least 99 wt % alpha-cellulose. The overly paper may be of the type intended for forming a protective wear layer in laminate flooring.

The overlay paper may comprise wear resistant particles, such as corundum.

The balancing layer may be free from kraft paper, or other papers comprising unbleached fibers, and/or natural resins.

The balancing layer may be free from wood veneer layers.

The second binder layer may be applied in liquid form.

The second binder layer may be provided in form of, or may be or comprise, a second resin impregnated paper arranged between the second surface of the core and the unimpregnated paper.

A fibre direction of the second resin impregnated paper forming the first binder layer may be oriented along a grain direction of the wood veneer layer.

A fibre direction of the second resin impregnated paper forming the first binder layer may be oriented substantially parallel to a grain direction of the wood veneer layer, such as parallel with 25° or less.

A fibre direction of the second resin impregnated paper forming the second binder layer may be oriented along a grain direction of the wood veneer layer.

A fibre direction of the second resin impregnated paper forming the second binder layer may be oriented substantially parallel to a grain direction of the wood veneer layer, such as parallel with 25° or less.

The first binder layer may be applied in liquid form.

The first binder layer may be provided in form of, or may be or comprise, a first resin impregnated paper arranged between the wood veneer layer and the first surface of the core.

Applying pressure may comprise pressing the surface layer at a first temperature, and pressing the balancing layer at second temperature, wherein the second temperature is lower than the first temperature.

The core may be a wood-based board.

The method may further comprise dividing the panel unit into individual panels after pressing.

The method may further comprise dividing the panel unit into individual panels after pressing, and wherein each panel complies with requirements defined in SS-EN 13329:2016+A1:2018 regarding cupping.

An upper surface of the panel at a short side edge of the panel may have a cupping of −0.15% to 0.2%.

An upper surface of the panel at a long side edge of the panel may have a cupping in the range of −0.5% to 1%.

A number exceeding 0 may indicate a convex cupping of the upper surface, and a number below 0 indicates a concave cupping of the upper surface, as seen from the upper surface.

The method may further comprise dividing the panel unit into individual panels after pressing, wherein a short side edge of the panel has a cupping of less than 0.2% of a width of the short side edge, such as in the range of −0.15% to 0.2%.

According to a second aspect, a panel is provided. The panel, comprising a core having a first surface and a second surface opposite the first surface, a surface layer arranged on a first surface of the core, the surface layer comprising a wood veneer layer adhered to the core by a first binder layer, and a balancing layer arranged at a second surface of the core, the balancing layer comprising an unimpregnated paper adhered by the core by a second binder layer.

The panel may be a building panel, such as a floor panel, a wall panel, a furniture component, a building component, a worktop, etc.

The balancing layer may consist of the unimpregnated paper and the second binder layer.

The unimpregnated paper may form a lowermost surface of the panel unit after pressing.

A fibre direction of the unimpregnated paper may be oriented along a grain direction of the wood veneer layer.

A fibre direction of the unimpregnated paper may be oriented substantially parallel to a grain direction of the wood veneer layer, such as parallel with 25° or less.

The unimpregnated paper may comprise alpha-cellulose, such as 80 wt % alpha-cellulose, such as at least 90 wt % alpha-cellulose, such as at least 95 wt % alpha-cellulose. The unimpregnated may be an alpha-cellulose paper.

The unimpregnated paper may be substantially free from natural resins, such as comprising less than 10 wt % natural resins, such as less than 5 wt % natural resins, such as less than 1 wt % natural resins.

The unimpregnated paper may comprise bleached fibres. The unimpregnated paper may be made from bleached pulp. The unimpregnated paper may be from delignified pulp.

The unimpregnated paper may have weight of 15-150 g/m$^2$, such as 15-50 g/m$^2$, such as 20-40 g/m$^2$.

The unimpregnated paper may be or comprise an unimpregnated décor paper. Such a décor paper may be coloured or comprise a print. Such a décor paper may comprise at least 80 wt % alpha-cellulose, such as at least 90 wt % alpha-cellulose, such as at least 95 wt % alpha-cellulose. The décor paper may of be the type intended for forming a decorative layer or décor layer in laminate flooring.

The unimpregnated paper may be or comprise an unimpregnated overlay paper. Such an overlay paper may be free from any print and/or décor. Such an overlay paper may comprise at least 90 wt % alpha-cellulose, such as at least 95 wt % alpha-cellulose, such as at least 99 wt % alpha-cellulose. The overly paper may be of the type intended for forming a protective wear layer in laminate flooring.

The overlay paper may comprise wear resistant particles, such as corundum.

The balancing layer may be free from kraft paper, or other papers comprising unbleached fibers, and/or natural resins.

The balancing layer may be free from wood veneer layer.

The panel may comply with requirements defined in SS-EN 13329:2016+A1:2018 regarding cupping of the panel.

An upper surface of the panel at a short side edge of the panel may have a cupping of −0.15% to 0.2%.

An upper surface of the panel at a long side edge of the panel may have a cupping in the range of −0.5% to 1%.

A short side edge of the panel may have a cupping less than 0.2% of a width of the panel, such as in the range of −0.15% to 0.2%.

A number exceeding 0 may indicate a convex cupping of the upper surface, and a number below 0 indicates a concave cupping of the upper surface, as seen from the upper surface.

By unimpregnated is understood to mean free from synthetic resin, or substantially free from synthetic resin, such as comprising less than 10 wt % of synthetic resin, preferably less than 5 wt % of synthetic resin, such as less than 2.5 wt % of synthetic resin prior pressing. In one example, no synthetic resin has been added to the paper prior to pressing.

The unimpregnated paper may be unimpregnated when applied, but may have absorb some resin during pressing. The term unimpregnated refers to the original properties of the paper prior to forming part of the panel unit.

The core may be a wood-based board.

According to a third aspect, a method to produce a panel unit is provided. The method comprises:

- providing a core having a first surface and a second surface opposite the first surface,
- applying a surface layer to the first surface of the core, the surface layer comprising a wood veneer layer and a first binder layer for adhering the wood veneer layer to the first surface of the e core,
- applying a balancing layer to a second surface of the core,
- applying pressure the surface layer, the balancing layer, and the core to form a panel unit,
- wherein applying pressure comprises pressing the surface layer at a first temperature, and pressing the balancing layer at second temperature, wherein the second temperature is lower than the first temperature.

The step of applying pressure may comprise applying heat and pressure.

The balancing layer may comprise a second binder layer.

After pressing, the panel unit may be divided into individual panels. The panels may be building panels, such as floor panels, wall panels, furniture panels, a countertop panel, etc.

A temperature difference between the first temperature and second temperature may be at least 10° C.

The temperature difference may be less than 20° C.

The temperature difference may be in the range of 10-20° C.

Both the first temperature and the second temperature may exceed ambient temperature.

Both the first temperature and the second temperature may exceed 120° C.

The first binder layer may be provided in form of, or may be or comprise, a first resin impregnated paper arranged between the wood veneer layer and the first surface of the core.

The balancing layer may comprise an unimpregnated paper and a second binder layer.

The second binder layer may be arranged intermediate the core and the unimpregnated paper.

The unimpregnated paper may comprise alpha cellulose.

The balancing layer may be provided in form of, or may be or comprise, a second resin impregnated paper arranged on the second surface of the core.

The first binder layer may be applied in liquid form.

The second binder layer may be applied in liquid form.

The method may further comprise dividing the panel unit into individual panels after pressing.

The method may further comprise dividing the panel unit into individual panels after pressing, and wherein each panel complies with requirements defined in SS-EN 13329:2016+A1:2018 regarding cupping.

An upper surface of the panel at a short side edge of the panel may have a cupping of −0.15% to 0.2%.

An upper surface of the panel at a long side edge of the panel may have a cupping in the range of −0.5% to 1%.

The method may further comprise dividing the panel unit into individual panels after pressing, wherein a short side edge of the panel has a cupping less than 0.2% of a width of the short side edge of the panel, such as in the range of −0.15% to 0.2%.

The balancing layer may be free from wood veneer layers.

The core may be a wood-based board.

BRIEF DESCRIPTION OF THE DRAWINGS

The present disclosure will by way of example be described in more detail with reference to the appended schematic drawings, which show embodiments of the present disclosure.

DETAILED DESCRIPTION OF EMBODIMENTS

Figure 1:
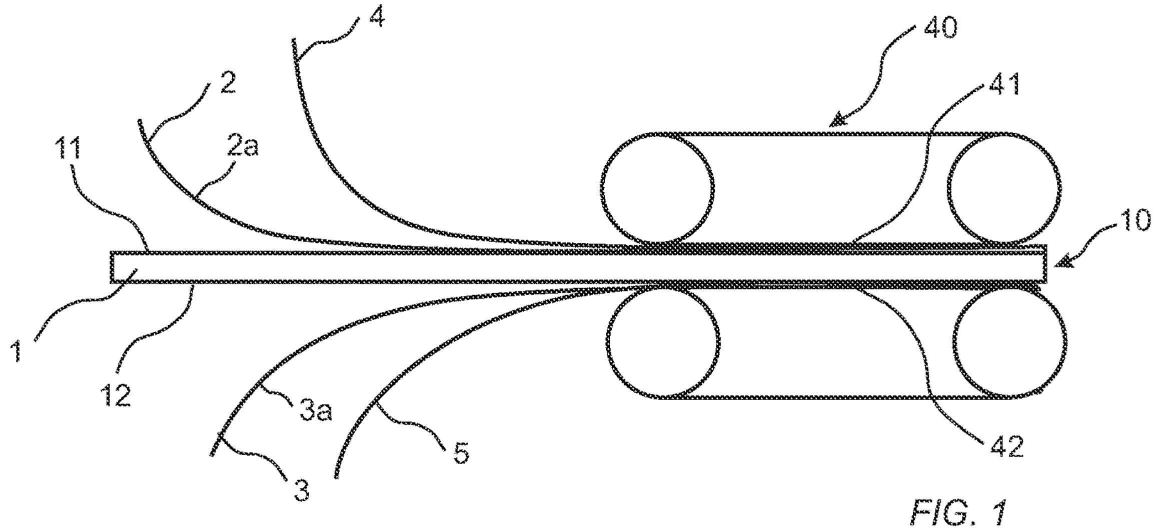
FIG. 1 shows an example of a process to produce a panel unit.

FIG. 1 shows an example of a process to produce a panel unit 10. The panel unit 10 may be intended form an individual panel, or may be intended to be divided into several individual panels. The panel may be a building panel, such as a floor panel, a wall panel, a furniture component, a building component, a worktop, etc. The building panel may be provided with a mechanical locking system, intended to join a building panel with another building panel.

In FIG. 1, a core 1 is provided. The core 1 may be a wood-based board, such as MDF or HDF board. The core 1 may be a plywood board. The core 1 may be a lamella core. The core 1 may be a particleboard. The core 1 may be a thermoplastic board. The core 1 is preferably produced prior to the present method. The core 1 may be wood fibre based. The core 1 may comprise a binder and fillers, such as organic and/or inorganic binders.

In one example, the core 1 is a single-layered core, and is not a multi-layered core, such as a plywood. In one example, the core 1 is different from a wood veneer layer 4, such as in material or construction. In one example, the core 1 is at least 2 times, such as 2-20 times, such as 3-10 times, as thick as a thickness of the wood veneer layer 4. The core 1 may be free from veneer layers.

The core 1 may have a thickness of 3-12 mm, such as 3-10 mm, such as 5-10 mm. The core 1 may be rigid, such as not being bendable, or at least 1 m long piece not being bendable under its own weight at ambient temperature (20° C.).

FIG. 1 shows an example wherein the process is a so-called continuous process. Certain layers may be provided in form of webs and be feed into the press.

On a first surface 11 of the core 1, a first binder layer 2 is arranged. In the example shown in FIG. 1, the first binder layer 2 is formed of a first resin impregnated paper 2*a*. The resin impregnated paper 2*a* is applied on the first surface 11 of the core 1.

The resin may be a thermosetting binder, such as an amino resin, for example melamine formaldehyde resin or urea formaldehyde. The resin may be urea formaldehyde, phenol formaldehyde, melamine formaldehyde, polyurethane, polyester, emulsion polymer isocyanate (PI), or a combination thereof. As an alternative, the resin may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof. The resin may comprise a hot melt or pressure sensitive adhesive. The resin may be an acrylic resin or a methacrylic resin.

In alternative examples, the first binder layer 2 may be provided and applied in different forms. For example, the first binder layer 2 may be provided as a first binder applied in liquid form on the first surface 11 of the core 1. As a further alternative, the first binder layer 2 may be provided as a first binder applied in powder from on the first surface 11 of the core 1. The first binder may in both examples of the type disclosed above with reference to the binder of the resin impregnated paper 2*a*.

The amount of the binder applied may be in the range of 75-150 g/m$^2$. In one example, the amount of the binder applied may be in the range of 50-300 g/m$^2$.

A wood veneer layer 4 is applied on the first binder layer 2, as shown in FIG. 1. The first wood veneer layer 4 may be a sliced veneer, rotary cut veneer, sawn veneer and/or half-round cut veneer.

The wood veneer layer 4 may be selected from oak, maple, birch, walnut, ash, and pine. The wood veneer layer 4 may have a thickness of less than 1 mm, such as 0.2 to 0.8 mm.

A thickness of the core 1 may exceed the thickness of the wood veneer layer 4. For example, the core 1 may have a thickness of 1-12 mm, such as 3-10 mm.

A fibre direction of the first resin impregnated paper 2*a* may be orientated substantially parallel to a grain direction of the wood veneer layer 4. By substantially parallel is intended to be within 25° from parallel, such as within 15° from parallel.

A fibre direction of a paper is formed during the paper making process, in which the fibres align themselves in the direction of the wire meshed upon the paper is formed. By the fibre direction is intended an average fibre direction, which at least 70% of the fibres, such as at least 80% of the fibres, are directed.

A grain direction is formed as the tree grows. Elongated longitudinal cells align themselves with an axis of the trunk, limb, or root, thereby forming a grain direction. By the grain direction is intended an average grain direction, which at least 70% of the wood fibres, such as at least 80% of the wood fibres, are directed in the wood veneer layer 4.

When the wood veneer layer 4 has been applied, the first binder layer 2 is arranged between the first surface 11 of the core 1 and the wood veneer layer 4.

The first binder layer 2 and the wood veneer layer 4 are intended to together form a surface layer 20 after pressing.

On a second surface 12 of the core 1, a second binder layer 3 is applied. The second surface 12 of the core 1 is opposite the first surface 11 of the core 1. In the example shown in FIG. 1, the second binder layer 3 is formed of a second resin impregnated paper 3*a*. The second resin impregnated paper 3*a* is applied to the second surface 12 of the core 1. A fibre direction of the second impregnated paper 3*a* may be orientated along the grain direction of the wood veneer layer 4. The fibre direction of the second impregnated paper 3*a* may be orientated substantially parallel to the grain direction of the wood veneer layer 4. By substantially parallel is intended to be within 25° from parallel, such as within 15° from parallel.

The resin may be a thermosetting binder, such as an amino resin, for example melamine formaldehyde resin or urea formaldehyde. The resin may be urea formaldehyde, phenol formaldehyde, melamine formaldehyde, polyurethane, polyester, emulsion polymer isocyanate (EPI), or a combination thereof. As an alternative, the resin may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof. The resin may comprise a hot melt or pressure sensitive adhesive. The resin may be an acrylic resin or a methacrylic resin.

In alternative examples, the second binder layer 3 may be provided and applied in different forms. For example, the second binder layer 3 may be provided as a second binder applied in liquid form on the second surface 12 of the core 1. As a further alternative, the second binder layer 3 may be provided as a second binder applied in powder from on the second surface 12 of the core 1. The second binder may in both examples of the type disclosed above with reference to the binder of the second resin impregnated paper 3*a*.

The amount of the binder applied may be in the range of 75-150 g/m$^2$. In one example, the amount of the binder applied may be in the range of 50-300 g/m$^2$.

An unimpregnated paper 5 is applied to the second binder layer 3. The unimpregnated paper 5 may comprise at least 80 wt % alpha-cellulose, such as at least 90 wt % alpha-cellulose, such as at least 95 wt % alpha-cellulose The unimpregnated paper 5 may be an unimpregnated overlay paper. In another example, the unimpregnated paper 5 may be of type used for a décor paper in laminate production, although not being impregnated.

An unimpregnated overlay paper may comprise at least 90 wt % alpha-cellulose, such as at least 95 wt % alpha-cellulose, such as at least 99 wt % alpha-cellulose.

The unimpregnated paper 5 may have a weight of 15-150 g/m$^2$, such as 15-50 g/m$^2$. In one example, the unimpregnated paper 5 may have a weight of 18-50 g/m$^2$, such as 20-40 g/m$^2$. In another example, the unimpregnated paper 5 may have a weight of 15-50 g/m$^2$.

By unimpregnated is understood to mean free from synthetic resin, or substantially free from synthetic resin, such as comprising less than 10 wt % of synthetic resin, preferably less than 5 wt % of synthetic resin, such as less than 2.5 wt % of synthetic resin. In one example, no synthetic resin has been added to the paper prior to being applied to the core.

Further, the unimpregnated paper may be substantially free from natural resins, such as comprising less than 10 wt % natural resins, such as less than 5 wt % resins, such as less than 1 wt % natural resins.

The unimpregnated paper may comprise bleached fibres. The unimpregnated paper may be made from bleached pulp. The unimpregnated paper may be from delignified pulp.

A fibre direction of the unimpregnated paper 3*a* may be orientated substantially parallel to a grain direction of the wood veneer layer 4. By substantially parallel is intended to be within 20° from parallel, such as within 10° from parallel.

The second binder layer 3 and the unimpregnated paper 5 are intended to form a balancing layer 30 after pressing. The balancing layer 30 are intended to balance forces formed by the surface layer 20, comprising the wood veneer layer 4 and the first binder layer 2, during pressing, after pressing, and when installed.

The wood veneer layer 4, the first binder layer 2, the core 1, the second binder layer 3 and the unimpregnated paper 5 are pressed together to form the panel unit 10 in a press 40. The press may be a stationary or, as shown in the example in FIG. 1, a continuous press 40.

The pressure applied may be in the range of 30-60 bar. The pressure time may be 10-60 s. The temperature applied may be in the range of 120-250° C., for example, in the range of 150-200° C., such as 180-200° C.

In one example, there is a temperature difference between a first press surface 41 intended to apply pressure to the surface layer 20 and a second press surface 42 intend to apply pressure to the balancing layer 30. The temperature of the first press surface 41 may be higher than the temperature of the second press surface 42. The wood veneer layer 4 of the surface layer 20 insulate the first binder layer 2 such that the temperature at the first binder layer 2 is lower than the temperature at the wood veneer layer 4. To compensate for the insulating effect of the wood veneer layer 4, the temperature applied may be increased. However, a corresponding increased temperature at the balancing layer 30 has been shown to be disadvantageous in view of balancing the final product.

The temperature difference between the first press surface 41, intended to press the surface layer 20 comprising the wood veneer layer 4, and the second press surface 42, surface intend to press the balancing layer 30, may be at least 10° C. The temperature difference may be less than 20° C. The temperature difference may be between 10-20° C.

Both the surface layer 20 and the balancing layer 30 may be pressed at a temperature exceeding ambient temperature, for example exceeding 120° C., such as 120-250° C. No cold pressing is intended, and both layers 20, 30 are hot pressed.

The temperature difference between the first press surface 41, intended to press the surface layer 20 comprising the wood veneer layer 4, and the second press surface 42, surface intend to press the balancing layer 30, may be used to control the shape of a panel 100 formed from the panel unit 10 after pressing. By increasing the temperature difference, a more concave shape of the panel 100 may be obtained.

After pressing, a panel unit 10 is obtained. The panel unit 10 can be divided into several individual panels 100, such as building panels. The width and length of such a panel 100 is less than the width and/or length of the panel unit 10. For example, the panel unit 10 may divided into 2-10 panels 100, such as 4-6 panels 100 per panel unit 10, depending on the original size of the panel unit 10 and the desired size of the building panels 100. The panels 100 may have a rectangular shape with opposing long side edges and opposing short side edges. The panel 100 may be a building panel, such as a floor panel, a wall panel, a furniture component, a building component, a worktop, etc. The panel 100 may be provided with a mechanical locking system, intended to join a panel with an adjacent panel.

After pressing, the panel 100 obtained from the panel unit 10 can fulfil at least the cupping requirements defined in standard SS-EN 13329:2016+A1:2018 regarding cupping of long side edge. After pressing, the panel 100 obtained from the panel unit 10 can fulfil at least the cupping requirements defined in standard SS-EN 13329:2016+A1:2018 regarding cupping of short side edge. Although defining laminate floorings, the requirement defined in this standard is desirable also for a panel with a veneered surface. Standard SS-EN 13329:2016+A1:2018 defines in respect of cupping that for laminate floorings cupping of an upper surface of the panel, e.g., the decorative surface of the panel, optionally including a transparent wear layer, at a long side edge should be ≤0.5% concave and ≤1% convex. Cupping is measured as the décor surface largest deviation from straight at an edge divided by the length of the edge. A number exceeding 0 indicates a convex cupping of the upper surface, and a number below 0 indicates a concave cupping of the upper surface, as seen from the upper surface. In one example, the upper surface 11 at a long side edge of the panel 100 fulfils the requirement of being ≤0.50% concave and ≤1.00% convex. In one example, the upper surface 11 of the panel 100 at the short side edge fulfil the requirement of being ≤0.50% concave and ≤1.00% convex. In one example, the upper surface 11 of the panel 100 at the short side edge fulfil the requirement of being ≤0.15% concave and ≤0.20% convex. In one example, the upper surface 11 at the short side edge of the panel 100 has substantially no cupping, i.e., close to 0 and being substantially flat, for example ≤0.15% concave and ≤0.2% convex. In one example, the upper surface 11 at the short side edge of the panel 100 has substantially no cupping, i.e., close to 0, for example, <0.15% concave and ≤0.2% convex, and the upper surface 11 at the long side edge of the panel 100 is ≤0.5% concave and ≤1% convex.

In the present disclosure, a wood veneer layer conventionally used as a balancing layer has been substituted by unimpregnated paper. It has been shown that properties of the unimpregnated paper can substitute properties of the wood veneer in respect of controlling cupping. As an example, the fibre direction of the unimpregnated can be used to simulate a grain direction of a wood veneer layer. By not including wood veneer in the balancing layer, less wood may be consumed, since correct balancing can be obtained with a balancing layer being free from wood veneer. Use of wood veneer is restricted to a surface of the panel 100 intended be visible when the panel is in use, for example installed as a floor panel or similar.

Further, it has been shown that replacing a wood veneer balancing layer with the unimpregnated paper results in an advantageous cupping of the panel 100. The short side cupping after pressing has been shown to be close to 0. Compared to a wood veneer balancing layer, the unimpregnated paper provides improved abilities to control the cupping of the panel 100.

Figure 2:
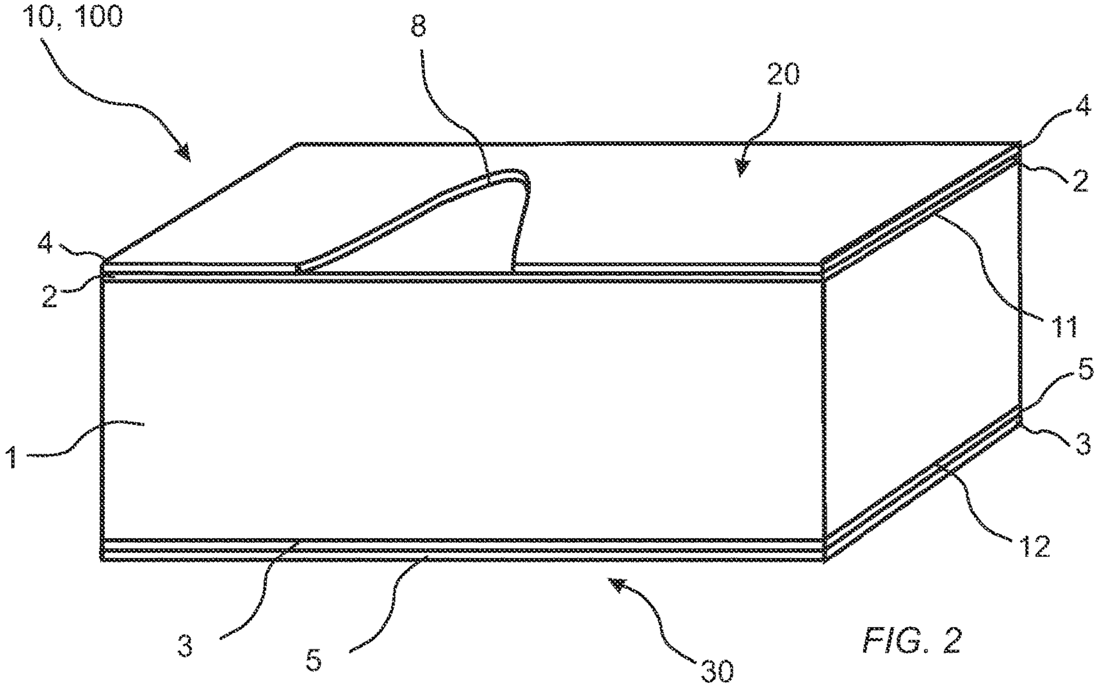
FIG. 2 shows a portion of a panel unit or panel produced according to the process shown in FIG. 1.

FIG. 2 shows the panel unit 10 after pressing, or the panel 100. The panel 100 may be a building panel, such as a floor panel, a wall panel, a furniture component, a building component, a worktop, etc.

FIG. 2 includes a cross-section, and a cross-sectional view of the panel unit 10 after pressing corresponds to a cross-sectional view of the panel 100, which is obtained by dividing the panel unit 10 after pressing. Therefore, FIG. 2 can represent both the panel unit 10 and the panel 100. For simplicity, in the following, reference will be made to the panel unit 10 only.

The panel unit 10 comprises the surface layer 20 arranged on the first surface 11 of the core 1 and the balancing layer 30 arranged on the second surface 12 of the core 1. The core 1 is of the type described above with reference to FIG. 1.

The surface layer 20 comprises the wood veneer layer 4 and the first binder layer 2. The wood veneer layer 4 is of the type described above with reference to FIG. 1. The first binder layer 2 is of the type describe above with reference to FIG. 1. As described above, the first binder layer 2 may comprise a first resin impregnated paper 2*a*. The first binder layer 2 is arranged between the first surface 11 of the core 1 and the wood veneer layer 4. Additional layers may be applied on an upper surface of the wood veneer layer 4. The wood veneer layer 4 may be provided with a coating, for example one or several lacquer layers, or a protective layer, such as an overlay.

The balancing layer 30 comprises the second binder layer 3 and the unimpregnated paper 5. The second binder layer 4 is arranged between the second surface 12 of the core 1 and the unimpregnated paper 5. The balancing layer 30 is free from wood veneer. The unimpregnated paper 5 is of the type and arranged as described above with reference to FIG. 1. The second binder layer 5 is of the type described above with reference to FIG. 1. As an example, the second binder layer 3 may comprise the second resin impregnated paper 3*a*.

During pressing, the unimpregnated paper 5 may absorb at least some of the binder 3*a* of the second binder layer 3. Thereby, the unimpregnated paper 5 may comprise some resin after pressing in some examples. However, the term unimpregnated is intended to indicate the original composition of the paper, i.e., the composition of the paper prior to be applied, as defined above.

As described above, the unimpregnated paper 5 acts correspondingly as a wood veneer arranged in the balancing layer 30. Cupping of the panel 100 is controlled to be less than a desired value. As an example, the panel 100 may fulfil the requirements regarding cupping defined in SS-EN 13329:2016+A1:2018 for long side edges. As an example, the panel 100 may fulfil the requirements regarding cupping defined in SS-EN 13329:2016+A1:2018 for short side edges. The cupping requirements in SS-EN 13329:2016+A1:2018 in respect of long side edges of a panel may be fulfilled for short side edges of the panel 100 as well. The cupping requirements in SS-EN 13329:2016+A1:2018 in respect of short side edges of a panel may be fulfilled for long side edges of the panel 100 as well.

Figure 3:
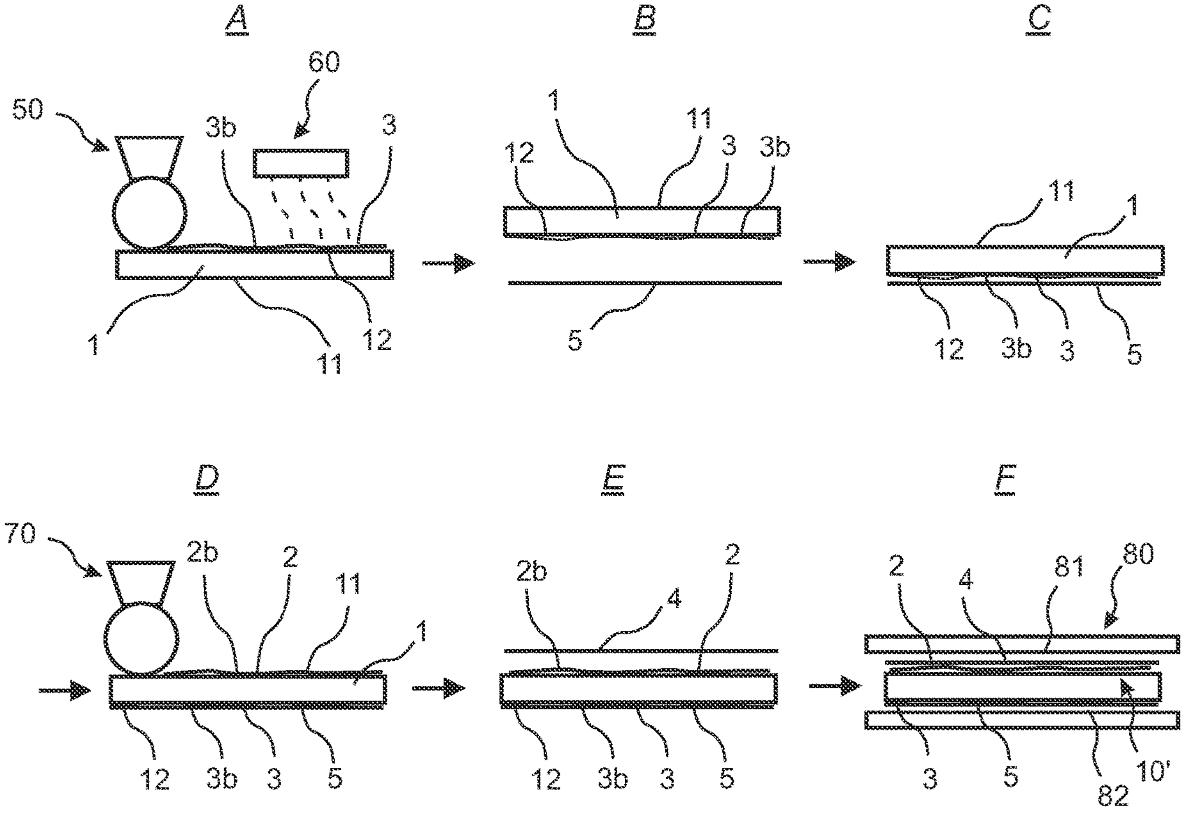
FIG. 3 shows an example of a process to produce a panel unit.

FIG. 3 shows an example of a process to produce a panel unit 10'. The panel unit 10' may be intended form an individual panel, or may be intended to be divided into several individual panels. The panel may be a building panel, such as a floor panel, a wall panel, a furniture component, a building component, a worktop, etc. The building panel may be provided with a mechanical locking system, intended to join a building panel with another building panel.

In FIG. 3, a core 1 is provided. The core 1 may be a wood-based board, such as MDF or HDF board. The core 1 may be a plywood board. The core 1 may be a lamella core. The core 1 may be a particleboard. The core 1 may be a thermoplastic board. The core 1 is preferably produced prior to the present method.

On a second surface 12 of the core 1, a second binder layer 3 is applied, which is shown in step A in FIG. 3.

In the example shown in FIG. 3, the second binder layer 3 is in form of a second binder 3*a* applied in liquid form. The second binder 3*a* may be applied by a roller 50, or any other suitable application device.

The second binder 3*a* of the second binder layer 3 may be a thermosetting binder, such as an amino resin, for example melamine formaldehyde resin or urea formaldehyde. The second binder 3*a* may be urea formaldehyde, phenol formaldehyde, melamine formaldehyde, polyurethane, polyester, emulsion polymer isocyanate (EPI), or a combination thereof. As an alternative, the second binder 3*a* may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof. The second binder 3*a* may comprise a hot melt or pressure sensitive adhesive. The second binder 3*a* may be an acrylic resin or a methacrylic resin. The terms resin and binder are used as substitutes and used with the same meaning in the disclosure.

The second binder 3*a* of the second binder layer 3 may be applied in an amount of 75-150 $g/m^2$. In one example, the amount of the binder applied may be in the range of 50-300 $g/m^2$. In one example, the second binder 3*a* may be applied as an aqueous solution comprising 50% water and 50% of the binder. Such an aqueous solution may be applied in an amount of 150-300 $g/m^2$. In another example, the aqueous solution comprising more than 50% water. The second binder layer 32 may further comprise fillers and additives.

The second binder 3*a* may be dried in a drying device 60, such as by application of IR to the binder 3*a*. After drying, the second binder 3*a* forms the second binder layer 3.

After the second binder 3*a* has been dried, the core 1 with the second binder layer 3 applied thereto can be turned, which takes place between step A and step B in FIG. 3. After the core 1 has been turned, the second surface 12 of the core 1 with the second binder layer 3 faces downwards. The first surface 11 of the core 1 faces upwards as seen in FIG. 3.

After turning the core 1, the core 1 may be placed on an unimpregnated paper 5 as shown in step B. The unimpregnated paper 5 may be an unimpregnated overlay paper. In another example, the unimpregnated paper 5 may be of type used for a decorative paper or décor paper in laminate production, although not being impregnated.

By unimpregnated is understood to mean free from resin, or substantially free from synthetic resin, such as comprising less than 10 wt % of synthetic resin, preferably less than 5 wt % of synthetic resin, such as less than 2.5 wt % of synthetic resin. In one example, no synthetic resin has been added to the paper prior to being applied on the core.

The unimpregnated paper 5 may be of the type described above with reference to FIGS. 1 and 2.

As an alternative or complement, the second binder 3*b* may be applied on a surface of the unimpregnated paper 5, for example in a similar way as described above and for example in liquid form as described above. The unimpregnated paper 5 with the second binder 3*b* applied thereto is thereafter arranged on the second surface 12 of the core 1. The second binder 3*b* is arranged between the second surface 12 of the core 1 and the unimpregnated paper 5.

In step C in FIG. 3, the core 1 is shown with the second binder layer 3 applied to the second surface of the core 12 and the unimpregnated paper 5. The second binder layer 3 is arranged between the second surface 12 of the core 1 and the unimpregnated paper 5. The second binder layer 3 and the unimpregnated paper 5 are intended to form a balancing layer 20 after pressing. The balancing layer 30 are intended to balance forces formed by a surface layer 20 during pressing, after pressing, and when installed.

In step D in FIG. 3, a first binder layer 2 is applied on the first surface 11 of the core 1. In the example shown in FIG. 3, the first binder layer 2 is in form of a first binder 2*a* applied in liquid form. The first binder 2*a* may be applied by a roller 70, or any other suitable application device.

The first binder 2*a* of the first binder layer 2 may be a thermosetting binder, such as an amino resin, for example melamine formaldehyde resin or urea formaldehyde. The first binder 2*a* may be urea formaldehyde, phenol formaldehyde, melamine formaldehyde, polyurethane, polyester, emulsion polymer isocyanate (EPI), or a combination thereof. As an alternative, the first binder 2*a* may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof. The first binder 2*a* may comprise a hot melt or pressure sensitive adhesive. The first binder 2*a* may be an acrylic resin or a methacrylic resin. The terms resin and binder are used as substitutes and used with the same meaning in the disclosure.

The first binder 2*a* of the first binder layer 2 may be applied in an amount of 75-150 g/m$^2$. In one example, the amount of the binder applied may be in the range of 50-300 g/m$^2$. If the first binder 2*a* is applied as an aqueous solution comprising 50% water and 50% of the binder. Such an aqueous solution may be applied in an amount of 150-300 g/m$^2$. In another example, the aqueous solution comprising more than 50% water. The first binder layer 2 may further comprise fillers and additives.

The first binder layer 2 may be dried after being applied.

In step E in FIG. 3, a wood veneer layer 4 is applied on the first binder layer 2. The wood veneer layer 4 may be a sliced veneer, rotary cut veneer, sawn veneer and/or half-round cut veneer.

The wood veneer layer 4 may be selected from oak, maple, birch, walnut, ash, and pine. The wood veneer layer 4 may have a thickness of less than 1 mm, such as 0.2 to 0.8 mm.

When the wood veneer layer 4 is applied, the first binder layer 2 is arranged between the first surface 11 of the core 1 and the wood veneer layer 4.

The first binder layer 2 and the wood veneer layer 4 are intended to together form a surface layer 20 after pressing.

The grain direction of the wood veneer layer 4 may be coordinated with a fibre direction of the unimpregnated paper 5, such that the unimpregnated paper 5 is arranged such that the fibre direction of the unimpregnated paper 5 is substantially parallel to the grain direction of the wood veneer layer 4. By substantially parallel is intended to be within 25° from parallel, such as within 15° from parallel.

As an alternative or complement, the first binder 2*b*, in one example applies as above and as an example in liquid form as described, may be applied on a surface of the wood veneer layer 4. The wood veneer layer 4 may then be arranged on the first surface 11 of the core 1. The first binder 2*b* may be arranged between the first surface 11 of the core and the wood veneer layer 4.

When the wood veneer layer 4 has been arranged on the first binder layer 2, the assembly is pressed, as shown in step F in FIG. 3. The assembly is pressed in a stationary press 80. The wood veneer layer 4, the first binder layer 2, the core 1, the second binder layer 3 and the unimpregnated layer 5 are pressed together to form a panel unit 10' under pressure and preferably also heat.

The pressure applied may be in the range of 30-60 bar. The pressure time may be 10-60 s. The temperature applied may be in the range of 120-250° C.

In one example, there is a temperature difference between a first press surface 81 intended to apply pressure to the surface layer 20 and a second press surface 82 intended to apply pressure to the balancing layer 30. The temperature of the first press surface 81 may be higher than the temperature of the second press surface 82. The wood veneer layer 4 of the surface layer 20 insulates the first binder layer 2 such that the temperature at the first binder layer 2 is lower than the temperature at the wood veneer layer 4. To compensate for the insulating effect of the wood veneer layer 4, the temperature applied may be increased. However, a corresponding increased temperature at the balancing layer 30 has been shown to be disadvantageous in view of balancing the final product.

The temperature difference between the first press surface 81, intended to press the surface layer 20 comprising the wood veneer layer 4, and the second press surface 82, intended to press the balancing layer 30, may be at least 10° C. The temperature difference may be less than 20° C. The temperature difference may be between 10-20° C.

The temperature difference between the first press surface 41, intended to press the surface layer 20 comprising the wood veneer layer 4, and the second press surface 42, surface intend to press the balancing layer 30, may be used to control the shape of a panel 100 formed from the panel unit 10 after pressing. By increasing the temperature difference, a more concave shape of the panel 100 may be obtained. If a specific shape is desired, the temperature difference may be outside the range described above.

After pressing, a panel unit 10' is obtained. The panel unit 10' can be divided into several individual panels 100', such as building panels. The width and length of such a panel 100' is less than the width and length of the panel unit 10'. For example, the panel unit 10' may be divided into 1-10 panels 100', for example 4-6 panels 100' per panel unit 10', depending on the original size of the panel unit 10' and the desired size of the building panels 100'. The panels 100' may have a rectangular shape with opposing long side edges and opposing short side edges. The panel 100' may be a building panel, such as a floor panel, a wall panel, a furniture component, a building component, a worktop, etc. The panel 100' may be provided with a mechanical locking system, intended to join a panel with an adjacent panel.

After pressing, the panel 100' obtained from the panel unit 10' can fulfil at least the cupping requirements defined in standard SS-EN 13329:2016+A1:2018 regarding cupping of long side. After pressing, the panel 100' obtained from the panel unit 10' can fulfil at least the cupping requirements defined in standard SS-EN 13329:2016+A1:2018 regarding cupping of short side. Although defining laminate floorings, the requirement defined in this standard is desirable also for a panel with a veneered surface. Standard SS-EN 13329:2016+A1:2018 defines in respect of cupping that for laminate floorings cupping of an upper surface of the panel at a long side edge should be ≤0.50% concave and 1.00% convex. Standard SS-EN 13329:2016+A1:2018 defines in respect of cupping that for laminate floorings cupping of an upper surface of the panel at a short side edge should be ≤0.15% concave and ≤0.20% convex. In one example, the upper surface 11 of the panel 100' at a long side edge fulfils the requirement of being less than 0.5% concave and max 1% convex. In one example, the upper surface 11 of the panel 100' at a short side edge fulfils the requirement of being less than 0.5% concave and max 1% convex. In one example, the upper surface 11 of the panel 100' at a short side edge fulfils the requirement of being ≤0.15% concave and ≤0.20% convex. In one example, a short side edge of the panel has substantially no cupping, i.e., close to 0 and being flat, for example maximum 0.15% concave and maximum 0.2% convex. In one example, the upper surface 11 at the short side edge of the panel 100' has substantially no cupping, i.e., close to 0, for example maximum 0.15% concave and maximum 0.2% convex and the upper surface 11 at the long side edge of the panel 100' is maximum 0.5% concave and maximum 1% convex.

In the present disclosure, a wood veneer layer conventionally forming the balancing layer has been substituted with the unimpregnated paper. It has been shown that properties of the unimpregnated paper can substitute properties of the wood veneer in respect of controlling cupping. As an example, the fibre direction of the unimpregnated paper can be used to simulate a grain direction of a wood veneer layer. Thereby, less wood may be consumed, since correct balancing can be obtained with a balancing layer being free from wood veneer. Use of wood veneer is restricted to a surface of the panel 100' which is intended be visible when the panel 100' is in use, for example installed as a floor panel or similar.

Further, it has been shown that replacing a wood veneer balancing layer with the unimpregnated paper results in an advantageous cupping of the panel 100'. The short side cupping after pressing has been shown to be close to 0. Compared to a wood veneer balancing layer, the unimpregnated paper provides improved abilities to control the cupping of the panel 100'.

Figure 4:
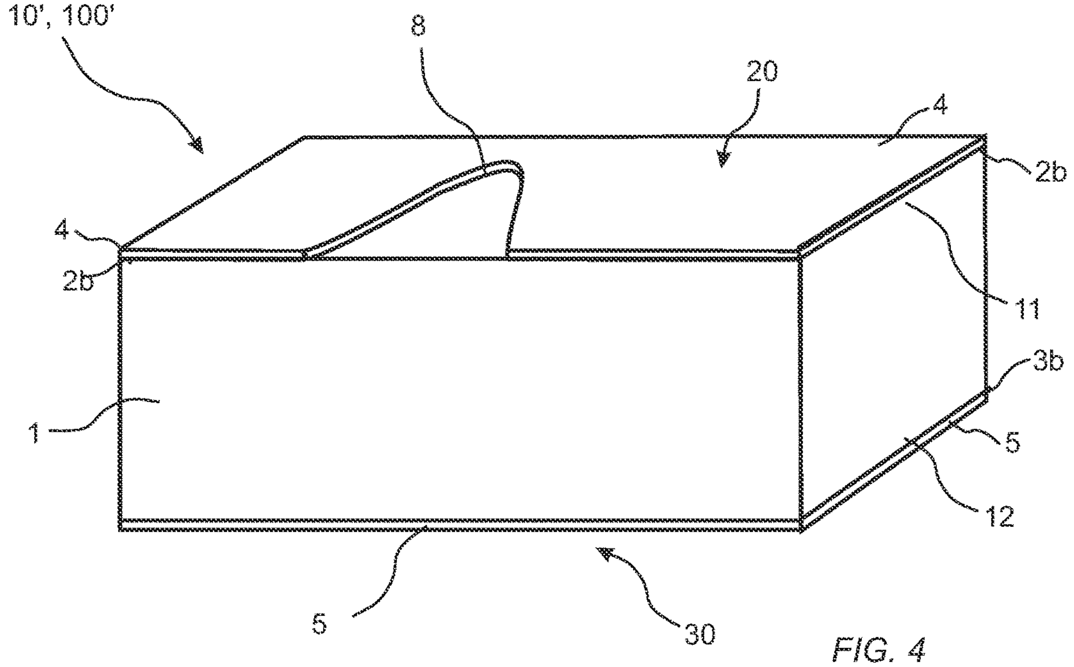
FIG. 4 shows a portion of a panel unit or panel produced according to the process shown in FIG. 3.

FIG. 4 shows the panel unit 10' after pressing, or the panel 100'. The panel 100' may be a building panel, such as a floor panel, a wall panel, a furniture component, a building component, a worktop, etc.

FIG. 4 includes a cross-section, and a cross-sectional view of the panel unit 10' after pressing corresponds to a cross-sectional view of the panel 100', which is obtained by dividing the panel unit 10' after pressing. Therefore, FIG. 4 can represent both the panel unit 10' and the panel 100'. For simplicity, in the following, reference will be made to the panel unit 10' only.

The panel unit 10' comprises the surface layer 20 arranged on the first surface 11 of the core 1 and the balancing layer 30 arranged on the second surface 12 of the core 1. The core 1 is of the type described above with reference to FIG. 1.

The surface layer 20 comprises the wood veneer layer 4 and the first binder layer 2. After pressing, as shown in FIG. 4, the first binder layer 2 may not be visible as an individual layer, since during pressing the binder **2*b* adheres the first surface 11 of the core and to a lower surface of the wood veneer layer 4. The binder 2*b* may have at least partly been absorbed by the first surface 11 of the core 1 and the wood veneer layer 4** after pressing.

The wood veneer layer 4 is of the type described above with reference to FIG. 3. The first binder layer 2 is of the type describe above with reference to FIG. 3. As described above, the first binder layer 2 may comprise the first binder **2*b*, which has been applied in liquid form and thereafter dried. The first binder layer 2 is arranged between the first surface 11 of the core 1 and the wood veneer layer 4. Additional layers may be applied on an upper surface of the wood veneer layer 4. The wood veneer layer 4** may be provided with a coating, for example one or several lacquer layers, or a protective layer, such as an overlay.

The balancing layer 30 comprises the second binder layer 3 and the unimpregnated paper 5. The second binder layer 3 is arranged between the second surface 12 of the core 1 and the unimpregnated paper 5. After pressing, as shown in FIG. 4, the second binder layer 3 may not be visible as an individual layer, since during pressing the second binder **3*b* adheres the second surface 12 of the core 1 and to a lower surface of the wood veneer layer 4. The second binder 3*b* may have at least partly been absorbed by the second surface 12 of the core 1 and the unimpregnated paper 5** after pressing.

The balancing layer 30 is free from wood veneer. The unimpregnated paper 5 is of the type and arranged as described above with reference to FIG. 3. The second binder layer 5 is of the type described above with reference to FIG. 3. As an example, the second binder layer 3 may be applied as the second binder **3*b*** applied in liquid form.

As indicated above, the unimpregnated paper 5 may absorb at least some of the second binder **3*b* of the second binder layer 3 during pressing. Thereby, the unimpregnated paper 5 may comprise some resin after pressing. However, the term unimpregnated is intended to indicate the original composition of the paper, i.e., the composition of the paper 5** prior to be applied, as defined above.

As described above, the unimpregnated paper 5 acts correspondingly as a wood veneer arranged in the balancing layer 30. Cupping of the panel 100' is controlled to be less than a desired value. As an example, the panel 100' may fulfil the cupping requirements defined in SS-EN 13329:2016+A1:2018 for long side edges. As an example, the panel 100' may fulfil the cupping requirements defined in SS-EN 13329:2016+A1:2018 for short side edges. The cupping requirements in SS-EN 13329:2016+A1:2018 in respect of long side edges of a panel may be fulfilled for short side edges of the panel 100'. The cupping requirements in SS-EN 13329:2016+A1:2018 in respect of short side edges of a panel may be fulfilled for long side edges of the panel 100'. In one example, the upper surface 11 at the short side edge of the panel 100' has substantially no cupping, i.e., close to 0, for example ≤0.15% concave and ≤0.20% convex, and the upper surface 11 at the long side edge of the panel 100' is ≤0.50% concave and ≤1.00% convex. In one example, the cupping of the upper surface 11 at the short side edge of the panel 100' may be ≤0.15% concave and ≤0.20% convex.

The aspect of the disclosure of adjusting a temperature of a first press surface intended to face the surface layer comprising a wood veneer layer to be higher than a temperature of a second press surface intend to face the balancing layer can be combined with any type of balancing layer and any type of binder layers. The aspect is not limited to a balancing layer comprising an unimpregnated paper, but can be used with any type of balancing layer being free from a wood veneer layer. The balancing layer may comprise a resin impregnated paper, a binder layer applied in powder form, a binder layer applied in liquid form, and/or combinations thereof. The first binder layer adhering the wood veneer layer to the core may be of any type, such as comprising a resin impregnated paper, a binder layer applied in powder form, a binder layer applied in liquid form, and/or combinations thereof. The core may be of the type disclosed above with reference to FIG. 1 and FIG. 3.

The temperature difference between the first press surface, intended to press the surface layer comprising a wood veneer layer, and the second press surface, surface intend to press the balancing layer, may be at least 10° C. The temperature difference may be less than 20° C. The temperature difference may be in the range of 10-20° C. The temperature difference may be 10-20° C. As described above, the temperature at the first press surface exceeds the temperature at the second press surface. The pressure applied may be in the range of 30-60 bar. The pressure time may be 10-60 s. The temperature applied may be in the range of 120-250° C., for example, in the range of 150-200° C., such as 180-200° C. For example, the surface layer may be pressed at approximately 180° C. and the balancing layer may be pressed at approximately 170° C.

The wood veneer layer of the surface layer insulates the first binder layer such that the temperature at the first binder layer is lower than the temperature at the wood veneer layer. To compensate for the insulating effect of the wood veneer layer, the temperature applied may be increased. However, a corresponding increased temperature at the balancing layer has been shown to be disadvantageous in view of balancing the final product.

Controlling the press temperature to be lower at the press surface facing the balancing layer has shown to be advantageous to obtain a slight convex cupping of long side edges of the panel, which is desirable. During installation, long side edges of the panel are pressed down during locking and forced to be substantially plane when locked to an adjacent long side edge. However, if the short side edges are not substantially flat, locking adjacent short side edges becomes difficult. In known solutions, efforts made to obtain a flat short side edges have resulted in convex cupping of long side edges, which is undesirable. Convex long side cupping may lead to difficulties when locking adjacent long side edges together.

The temperature difference between the first press surface 41, intended to press the surface layer 20 comprising the wood veneer layer 4, and the second press surface 42, surface intend to press the balancing layer 30, may be used to control the shape of a panel 100 formed from the panel unit 10 after pressing. By increasing the temperature difference, a more concave shape of the upper surface of the panel 100 may be obtained. If a specific shape is desired, the temperature difference may be outside the range described above.

The press temperature for the first press surface and the second press surface may be in the range of 120-250° C. The pressure applied by the first press surface and the second press surface may be in the range of 30-60 bar. The pressure time may be 10-60 s.

EXAMPLES

Example 1A: Reference Example

A liquid solution comprising melamine formaldehyde resin having a composition of 50 wt % water and 50 wt % melamine formaldehyde was applied in an amount of about 126 g/m$^2$ on a HDF core. An oak veneer layer having a thickness of 0.6 mm was applied on the melamine formaldehyde layer, and heat and pressure were applied to form a panel unit. Pressure applied was 50 bar, temperature 180° C., and pressing time 30 s.

After pressing, the panel unit is divided into panels, having a long side length of 750 mm and a short side width of 250 mm. The panels have no balancing layer intended to balance the surface layer comprising the wood veneer layer.

After pressing and after cooling to ambient temperature (approximately 20° C.), cupping is measured on one of the panels. Cupping of the upper surface of the panel at long side edge was measured to −1.762 mm and cupping of the upper surface of the panel at short side edge was measured to −0.391 mm, see table 1. The largest deviation from zero is measured. Zero indicates no cupping (flat), a number exceeding 0 indicates a convex cupping of the upper surface, and a number below 0 indicates a concave cupping of the upper surface. In this example, the upper surface of the panel has a concave cupping a both long side edge and short side edge.

Example 1B

A first layer of a liquid solution comprising melamine formaldehyde resin having a composition of 50 wt % water and 50 wt % melamine formaldehyde was applied in an amount of 126 g/m$^2$ on a HDF core. An oak veneer layer having a thickness of 0.6 mm was applied on the melamine formaldehyde resin layer. The wood veneer layer and the melamine formaldehyde resin layer form a surface layer.

A second layer of a liquid solution comprising melamine formaldehyde resin having a composition of 50 wt % water and 50 wt % melamine formaldehyde was applied in an amount of 126 g/m$^2$ on an opposite surface of the HDF core. An unimpregnated overlay paper was applied on the layer of melamine formaldehyde resin. The unimpregnated paper was arranged such that a fibre direction of the unimpregnated paper was substantially parallel to a grain direction of the wood veneer layer. The second layer of melamine formaldehyde resin and the unimpregnated overlay paper form a balancing layer.

The assembly was pressed with heat and pressure applied to form a panel unit. Pressure applied was 50 bar, temperature 180° C. at both upper and lower press plates, and pressing time 30 s. After pressing, the panel unit was divided into panels, having a long side length of 750 mm and a short side width of 250 mm.

After pressing and after cooling to ambient temperature (approximately 20° C.), cupping is measured on one of the panels. Cupping of the upper surface of the panel at long side edge was measured to 0.220 mm and cupping of the upper surface of the panel at short side edge was measured to −0.38 mm, see table 1. The largest deviation from zero is measured. Zero indicates no cupping (flat), a number exceeding 0 indicates a convex cupping of the upper surface, and a number below zero indicates a concave cupping of the upper surface. In this example, the upper surface of the panel has a convex cupping at a long side edge and concave cupping at a short side edge.

Example 1C

A first layer of a liquid solution comprising melamine formaldehyde resin having a composition of 50 wt % water and 50 wt % melamine formaldehyde was applied in an amount of 126 g/m$^2$ on a HDF core. An oak veneer layer having a thickness of 0.6 mm was applied on the melamine formaldehyde resin layer. The wood veneer layer and the melamine formaldehyde resin layer form a surface layer.

A second layer of a liquid solution comprising melamine formaldehyde resin having a composition of 50 wt % water and 50 wt % melamine formaldehyde was applied in an amount of 126 g/m$^2$ on an opposite surface of the HDF core. An unimpregnated décor paper was applied on the layer of melamine formaldehyde resin. The unimpregnated paper was arranged such that a fibre direction of the unimpregnated paper was substantially parallel to a grain direction of the wood veneer layer. The second layer of melamine formaldehyde resin and the unimpregnated décor paper form a balancing layer.

The assembly was pressed with heat and pressure applied to form a panel unit. Pressure applied was 50 bar, temperature 180° C. at both upper and lower press plates, and pressing time 30 s. After pressing, the panel unit was divided into panels, having a long side length of 750 mm and a short side width of 250 mm.

After pressing and after cooling to ambient temperature (approximately 20° C.), cupping is measured on one of the panels. Cupping of the upper surface of the panel at a long side edge was measured to 0.244 mm and cupping of the upper surface of the panel at a short side edge cupping measured to −0.28 mm, see table 1. The largest deviation from zero is measured. Zero indicates no cupping (flat), a number exceeding 0 indicates a convex cupping of the upper surface, and a number below 0 indicates a concave cupping of the upper surface. In this example, the upper surface of the panel has a convex cupping at both long side edge and short side edge.

Example 2A: Reference Example

A resin impregnated décor paper comprising melamine formaldehyde resin was applied on a HDF core. An oak veneer layer having a thickness of 0.6 mm was applied on the resin impregnated paper, and heat and pressure were applied to form a panel unit. Pressure applied was 50 bar, temperature 180° C., and pressing time 30 s.

After pressing, the panel unit is divided into panels, having a long side length of 750 mm and a short side width of 250 mm. The panels have no balancing layer intended to balance the surface layer comprising the wood veneer layer.

After pressing and after cooling to ambient temperature (approximately 20° C.), cupping is measured on one of the panels. Cupping of the upper surface of the panel at long side edge was measured to −2.069 mm and cupping of the upper surface of the panel at a short side edge was measured to −0.479 mm, see table 1. The largest deviation from zero is measured. Zero indicates no cupping (flat), a number exceeding 0 indicates a convex cupping of the upper surface, and a number below zero indicates a concave cupping of the upper surface. In this example, the upper surface of the panel has a concave cupping at both long side edge and short side edge.

Example 2B

A first resin impregnated décor paper comprising melamine formaldehyde resin was applied to an upper surface of the HDF core. An oak veneer layer having thickness of 0.6 mm was applied on the first resin impregnated paper. The first resin impregnated paper was arranged such that a fibre direction of the first resin impregnated paper was substantially parallel to a grain direction of the wood veneer layer. The wood veneer layer and the first resin impregnated paper form a surface layer.

A second resin impregnated décor paper comprising melamine formaldehyde resin was applied to a lower surface of the HDF core. The corresponding binder amount was 126 g/m$^2$. An unimpregnated décor paper was applied on the second resin impregnated paper. The unimpregnated paper was arranged such that a fibre direction of the unimpregnated paper was substantially parallel to a grain direction of the wood veneer layer. The second resin impregnated paper was arranged such that a fibre direction of the second resin impregnated paper was substantially parallel to a grain direction of the wood veneer layer. The second impregnated paper and the unimpregnated paper form a balancing layer.

The assembly was pressed with heat and pressure applied to form a panel unit. Pressure applied was 50 bar, temperature 180° C. at both upper and lower press plates, and pressing time 30 s. After pressing, the panel unit is divided into panels, having a long side length of 750 mm and a short side width of 250 mm.

After pressing and after cooling to ambient temperature (approximately 20° C.), cupping is measured on one of the panels. Cupping of the upper surface of the panel at long side edge was measured to 1.281 mm and cupping of the upper surface of the panel at a short side edge was measured to 0.033 mm, see table 1. The largest deviation from zero is measured. Zero indicates no cupping (flat), a number exceeding 0 indicates a convex cupping of the upper surface, and a number below zero indicates a concave cupping of the upper surface. In this example, the upper surface of the panel has a convex cupping at both long side edge and short side edge.

Example 2C

A first resin impregnated décor paper comprising melamine formaldehyde resin was applied to an upper surface of the HDF core. An oak veneer layer having a thickness of 0.6 mm was applied on the first resin impregnated paper. The first resin impregnated paper was arranged such that a fibre direction of the first resin impregnated paper was substantially parallel to a grain direction of the wood veneer layer. The wood veneer layer and the first resin impregnated paper form a surface layer.

A second resin impregnated décor paper comprising melamine formaldehyde resin was applied to a lower surface of the HDF core. An unimpregnated décor paper was applied on the second resin impregnated paper. The unimpregnated paper was arranged such that a fibre direction of the unimpregnated paper was substantially transverse to a grain direction of the wood veneer layer. The second resin impregnated paper was arranged such that a fibre direction of the second resin impregnated paper was substantially parallel to a grain direction of the wood veneer layer. The second impregnated paper and the unimpregnated paper form a balancing layer.

The assembly was pressed with heat and pressure applied to form a panel unit. Pressure applied was 50 bar, temperature 180° C. at both upper and lower press plates, and pressing time 30 s. After pressing, the panel unit is divided into panels, having a long side length of 750 mm and a short side width of 250 mm.

After pressing and after cooling to ambient temperature (approximately 20° C.), cupping is measured on one of the panels. Cupping of the upper surface of the panel at a long side edge was measured to 0.912 mm and cupping of the upper surface of the panel at a short side edge was measured to 0.031 mm, see table 1. The largest deviation from zero is measured. Zero indicates no cupping (flat), a number exceeding 0 indicates a convex cupping of the upper surface, and a number below zero indicates a concave cupping of the upper surface. In this example, the upper surface of the panel has a convex cupping at both long side edge and short side edge.

Example 3A: Reference Example

A first resin impregnated décor paper comprising melamine formaldehyde resin was applied on a HDF core. An oak veneer layer having a thickness of 0.6 mm was applied on the resin impregnated paper. The wood veneer layer and the first resin impregnated paper form a surface layer.

A second resin impregnated décor paper comprising melamine formaldehyde resin was applied to a lower surface of the HDF core. The second impregnated paper forms a balancing layer.

Pressure applied was 50 bar, temperature 180° C., and pressing time 30 s. The panel unit is divided into panels, having a long side length of 750 mm and a short side width of 250 mm. The press plate facing the surface layer had substantially the same temperature as the press plate facing the balancing layer, i.e., both press plates had a temperature of 180° C.

After pressing, the panel unit is divided into panels, having a long side length of 750 mm and a short side width of 250 mm.

After pressing and after cooling to ambient temperature (approximately 20° C.), cupping is measured on one of the panels. Cupping of the upper surface of the panel at a long side edge was measured to 0.613 mm and cupping of the upper surface of the panel at a short side edge was measured to 0.043 mm, see table 1. The largest deviation from zero is measured. Zero indicates no cupping (flat), a number exceeding 0 indicates a convex cupping of the upper surface, and a number below zero indicates a concave cupping of the upper surface. In this example, the upper surface of the panel has a convex cupping at both short side edge and long side edge.

Example 3B

A first resin impregnated décor paper comprising melamine formaldehyde resin was applied on a HDF core. An oak veneer layer having a thickness of 0.6 mm was applied on the resin impregnated paper. The wood veneer layer and the first resin impregnated paper form a surface layer.

A second resin impregnated décor paper comprising melamine formaldehyde resin was applied to a lower surface of the HDF core. The second impregnated paper forms a balancing layer.

Pressure applied was 50 bar, and pressing time 30 s. The panel unit is divided into panels, having a long side length of 750 mm and a short side width of 250 mm. The press plate facing the surface layer had a temperature of about 180° C. The press plate facing the surface layer had a temperature of about 170° C.

After pressing, the panel unit is divided into panels, having a long side length of 750 mm and a short side width of 250 mm.

After pressing and after cooling to ambient temperature (approximately 20° C.), cupping is measured on one of the panels. Cupping of the upper surface of the panel at long side edge was measured to 0.110 mm and cupping of the upper surface of the panel at a short side edge was measured to −0.216 mm, see table 1. The largest deviation from zero is measured. Zero indicates no cupping (flat), a number exceeding 0 indicates a convex cupping of the upper surface, and a number below zero indicates a concave cupping of the upper surface. In this example, the upper surface at short side edge has a slight concave cupping, and the upper surface at long side edge has a convex cupping.

TABLE 1

| Example | Long side maximum measurement (mm) | Long side cupping expressed as percentage % | Short side maximum measurement (mm) | Short side cupping expressed as percentage % |
|---|---|---|---|---|
| 1A | −1.762 | −0.235 | −0.391 | −0.156 |
| 1B | 0.22 | 0.029 | −0.38 | −0.152 |
| 1C | 0.244 | 0.033 | −0.28 | −0.112 |
| 2A | −2.069 | −0.276 | −0.479 | −0.192 |
| 2B | 1.281 | 0.171 | 0.033 | 0.013 |
| 2C | 0.912 | 0.122 | 0.031 | 0.012 |
| 3A | 0.613 | 0.082 | 0.043 | 0.017 |
| 3B | 0.11 | 0.015 | −0.216 | −0.086 |

Cupping expressed as percentage is calculated as maximum long/short side measurement divided by length of long side/short side, and expressed in percentage.

Item List:

1. A method to produce a panel unit (10; 10'), comprising
providing a core (1) having a first surface (11) and a second surface (12) opposite the first surface (11),
applying a surface layer (20) to the first surface (11) of the core (1), the surface layer (20) comprising a wood veneer layer (4) and a first binder layer (2) for adhering the wood veneer layer (4) to the first surface (11) of the core (1),
applying a balancing layer (30) to a second surface (12) of the core (1), the balancing layer (30) comprising an unimpregnated paper (5) and a second binder layer (3) for adhering the unimpregnated paper (5) to the second surface (12) of the core (1),
applying heat and pressure to the surface layer (20), the balancing layer (30), and the core (1) to form a panel unit (10; 10').

2. The method according to item 1, wherein the balancing layer (30) consists of the unimpregnated paper (5) and the second binder layer (3).

3. The method according to item 1 or 2, wherein the unimpregnated paper (5) forms a lowermost surface of the panel unit (10; 10') after pressing.

4. The method according to any one of items 1-3, wherein the unimpregnated paper (5) comprises alpha cellulose.

5. The method according to any one of items 1-4, wherein a fibre direction of the unimpregnated paper (5) is oriented substantially parallel to a grain direction of the wood veneer layer (4).

6. The method according to any one of items 1-5, wherein the unimpregnated paper (5) is an unimpregnated décor paper.

7. The method according to any one of items 1-5, wherein the unimpregnated paper (5) is an unimpregnated overlay paper.

8. The method according to any one of items 1-7, wherein the balancing layer (20) is free from wood veneer layers.

9. The method according to any one of items 1-8, wherein the second binder layer (3) is applied in liquid form.

10. The method according to any one of items 1-8, wherein the second binder layer (3) is a second resin impregnated paper (3*a*) arranged between the second surface (12) of the core (1) and the unimpregnated paper (5).

11. The method according to item 10, wherein a fibre direction of the second resin impregnated paper is oriented substantially parallel to a grain direction of the wood veneer layer.

12. The method according to any one of items 1-11, wherein the first binder layer (2) is applied in liquid form.

13. The method according to any one of items 1-11, wherein the first binder layer (2) is a first resin impregnated paper (2*a*) arranged between the wood veneer layer (4) and the first surface (11) of the core (1).

14. The method according to any one of items 1-13, wherein applying pressure comprises pressing the surface layer at a first temperature, and pressing the balancing layer at second temperature, wherein the second temperature is lower than the first temperature.

15. The method according to any one of items 1-14, further comprising dividing the panel unit (10; 10') into individual panels (100; 100') after pressing, wherein a short side edge of the panel has a cupping of less than 0.2% of a width of the short side edge of the panel, such as in the range of −0.15% to 0.2%.

16. A panel (100; 100'), comprising a core (1) having a first surface (11) and a second surface (12) opposite the first surface (11), a surface layer (20) arranged on the first surface (11) of the core (1), the surface layer (20) comprising a wood veneer layer (4) adhered to the core (1) by a first binder layer (2), a balancing layer (30) arranged at the second surface (12) of the core (1), the balancing layer (30) comprising an unimpregnated paper (5) adhered by the core (1) by a second binder layer (3).

17. The panel according to item 16, wherein the balancing layer (30) consists of the unimpregnated paper (5) and the second binder layer (3).

18. The panel according to item 16 or 17, wherein the unimpregnated paper (5) forms a lowermost surface of the panel (100; 100').

19. The panel according to any one of items 16-18, wherein a fibre direction of the unimpregnated paper (5) is oriented substantially parallel to a grain direction of the wood veneer layer (4).

20. The panel according to any one of items 16-19, wherein the unimpregnated paper (5) comprises alpha cellulose.

21. The panel according to any one of items 16-20, wherein the unimpregnated paper (5) is an unimpregnated décor paper.

22. The panel according to any one of items 16-20, wherein the unimpregnated paper (5) is an unimpregnated overlay paper.

23. The panel according to any one of items 26-22, wherein the balancing layer (30) is free from wood veneer layers.

24. A method to produce a panel unit (10; 10'), comprising providing a core (1) having a first surface (11) and a second surface (12) opposite the first surface (11), applying a surface layer (20) to the first surface (11) of the core (1), the surface layer (20) comprising a wood veneer layer (4) and a first binder layer (2) for adhering the wood veneer layer (4) to the first surface (11) of the e core (1), applying a balancing layer (30) to a second surface (12) of the core (1), applying heat and pressure the surface layer (20), the balancing layer (30), and the core (1) to form a panel unit (10; 10'), wherein applying heat and pressure comprises pressing the surface layer (20) at a first temperature, and pressing the balancing layer (30) at second temperature, wherein the second temperature is lower than the first temperature.

25. The method according to item 24, wherein a temperature difference between the first temperature and second temperature is at least 10° C.

26. The method according to item 24 or 25, wherein the temperature difference is less than 20° C.

27. The method according to any one of items 24-26, wherein the balancing layer (30) comprises an unimpregnated paper (5) and a second binder layer (3).

28. The method according to item 27, wherein the second binder layer (3) is applied in liquid form.

29. The method according to any one of items 24-28, wherein the balancing layer (30) comprises a second resin impregnated paper (3*a*) arranged on the second surface (12) of the core (1).

30. The method according to any one of items 24-29, wherein the first binder layer (2) is a first resin impregnated paper (2*a*) arranged between the wood veneer layer (4) and the first surface (11) of the core (1).

31. The method according to any one of items 24-30, wherein the first binder layer (3) is applied in liquid form.

32. The method according to any one of items 24-31, wherein the balancing layer (30) is free from wood veneer layers.

The invention claimed is:

1. A method to produce a panel unit, comprising providing a core having a first surface and a second surface opposite the first surface, applying a surface layer to the first surface of the core, the surface layer comprising a wood veneer layer and a first binder layer for adhering the wood veneer layer to the first surface of the core, applying a balancing layer to a second surface of the core, the balancing layer comprising an unimpregnated paper and a second binder layer for adhering the unimpregnated paper to the second surface of the core, wherein the unimpregnated paper comprises alpha cellulose, wherein the second binder layer is in liquid form or powder form when the unimpregnated paper is applied to the second surface of the core, applying heat and pressure to the surface layer, the balancing layer, and the core to form a panel unit.

2. The method according to claim 1, wherein the balancing layer consists of the unimpregnated paper and the second binder layer.

3. The method according to claim 1, wherein the unimpregnated paper forms a lowermost surface of the panel unit after pressing.

4. The method according to claim 1, wherein a fibre direction of the unimpregnated paper is oriented substantially parallel to a grain direction of the wood veneer layer.

5. The method according to claim 1, wherein the balancing layer is free from wood veneer layers.

6. The method according to claim 1, wherein the second binder layer is applied in liquid form on the second surface of the core.

7. The method according to claim 1, wherein the first binder layer is applied in liquid form.

8. The method according to claim 1, wherein the first binder layer is a first resin impregnated paper arranged between the wood veneer layer and the first surface of the core.

9. The method according to claim 1, wherein applying pressure comprises pressing the surface layer at a first temperature, and pressing the balancing layer at second temperature, wherein the second temperature is lower than the first temperature.

10. The method according to claim 1, further comprising dividing the panel unit into individual panels after pressing, wherein a short side edge of the panel has a cupping of less than 0.2% of a width of the short side edge of the panel.

11. The method according to claim 1, wherein the unimpregnated paper is substantially free of natural resin and synthetic resin.

12. The method according to claim 1, wherein the second binder layer is in liquid form when the unimpregnated paper is applied to the second surface of the core.

13. The method according to claim 1, wherein the second binder layer is in powder form when the unimpregnated paper is applied to the second surface of the core.

14. A method to produce a panel unit, comprising providing a core having a first surface and a second surface opposite the first surface, applying a surface layer to the first surface of the core, the surface layer comprising a wood veneer layer and a first binder layer for adhering the wood veneer layer to the first surface of the core, applying a balancing layer to a second surface of the core, the balancing layer comprising an unimpregnated paper and a second binder layer for adhering the unimpregnated paper to the second surface of the core, and applying heat and pressure to the surface layer, the balancing layer, and the core to form a panel unit, wherein applying heat and pressure comprises pressing the surface layer at a first temperature, and pressing the balancing layer at second temperature, wherein the second temperature is lower than the first temperature.

15. The method according to claim 14, wherein a temperature difference between the first temperature and second temperature is at least 10° C.

16. The method according to claim 14, wherein the temperature difference is less than 20° C.

17. The method according to claim 14, wherein the balancing layer is free from wood veneer layers.

18. The method according to claim 14, wherein the second binder layer is in liquid form when the unimpregnated paper is applied to the second surface of the core.

19. The method according to claim 14, wherein the second binder layer is in powder form when the unimpregnated paper is applied to the second surface of the core.

20. The method according to claim 14, wherein the second binder layer is applied in liquid form on the second surface of the core.

* * * * *